(12) United States Patent
Moore

(10) Patent No.: US 7,536,792 B2
(45) Date of Patent: May 26, 2009

(54) HEAD FOR A ROTARY LINE TRIMMER APPARATUS

(76) Inventor: Mark R. Moore, 400 Bagdad Rd., Westlake, LA (US) 70669

( * ) Notice: Subject to any disclaimer, the term of this patent is extended or adjusted under 35 U.S.C. 154(b) by 167 days.

(21) Appl. No.: 11/649,604

(22) Filed: Jan. 3, 2007

(65) Prior Publication Data

US 2008/0155837 A1     Jul. 3, 2008

(51) Int. Cl.
*A01D 34/416* (2006.01)

(52) U.S. Cl. .......................................... 30/276; 30/347

(58) Field of Classification Search .................. 30/276, 30/347; 56/12.7
See application file for complete search history.

(56) References Cited

U.S. PATENT DOCUMENTS

| | | | |
|---|---|---|---|
| 4,271,595 A | 6/1981 | Rahe |
| 4,285,128 A | 8/1981 | Schnell et al. |
| 4,287,709 A | 9/1981 | Lowry et al. |
| 4,290,200 A | 9/1981 | Lombard |
| 4,301,642 A | 11/1981 | Thurber |
| 4,312,178 A | 1/1982 | Callahan |
| 4,335,510 A | 6/1982 | Close et al. |
| 4,341,060 A | 7/1982 | Lowry et al. |
| 4,343,139 A | 8/1982 | Lowry et al. |
| 4,362,007 A | 12/1982 | Kennedy et al. |
| 4,389,836 A | 6/1983 | Lowry et al. |
| 4,411,069 A | 10/1983 | Close et al. |
| 4,411,126 A | 10/1983 | Lowry et al. |
| 4,412,382 A | 11/1983 | White, III |
| 4,428,183 A | 1/1984 | Lowry et al. |
| 4,442,659 A | 4/1984 | Enbusk |
| 4,446,680 A | 5/1984 | D'Alessandro |
| 4,463,544 A | 8/1984 | Carsello et al. |
| 4,512,143 A | 4/1985 | Jimenez |
| 4,531,350 A | 7/1985 | Huthmacher |
| 4,566,189 A | 1/1986 | Muto |
| 4,571,831 A | 2/1986 | White, III |
| 4,586,257 A | 5/1986 | Rittenhouse |
| 4,587,800 A | 5/1986 | Jimenez |
| 4,599,796 A | 7/1986 | Baba |
| D285,079 S | 8/1986 | Huthmacher |
| 4,633,658 A | 1/1987 | Nogawa |
| 4,641,431 A | 2/1987 | Leming et al. |
| 4,644,655 A | 2/1987 | Botamiller et al. |
| 4,651,421 A | 3/1987 | Zerrer |
| 4,660,286 A | 4/1987 | Engelbrecht |

(Continued)

FOREIGN PATENT DOCUMENTS

| | | |
|---|---|---|
| WO | WO2004/064489 | 8/2004 |
| WO | WO2004/064491 | 8/2004 |
| WO | WO2004/064492 | 8/2004 |
| WO | WO2004/064493 | 8/2004 |
| WO | WO2004/064494 | 8/2004 |
| WO | WO2005/074668 | 8/2005 |

*Primary Examiner*—Hwei-Siu C Payer
(74) *Attorney, Agent, or Firm*—Schultz & Associates, P.C.

(57) ABSTRACT

An improved head for a flexible line trimmer apparatus is provided. The improved head includes a metal tubing that extends through the head and surrounds a cutting line of selected length. The tubing is provided with a flared exit portal increasing the efficiency of the head. The contact surface eliminates the possibility of the cutting line fusing to plastic surfaces due to heating caused by friction. The head is surrounded with an interior perimeter counterweight to store kinetic energy on each end having a parabolic surface of revolution concentric with the axis of the tubing. A replaceable cartridge is provided to increase the ease of maintenance and the useful life of the head.

14 Claims, 9 Drawing Sheets

U.S. PATENT DOCUMENTS

| | | |
|---|---|---|
| 4,679,385 A | 7/1987 | Carmine |
| 4,685,279 A | 8/1987 | Gullett |
| 4,688,376 A | 8/1987 | Wolfe, Sr. |
| 4,704,849 A | 11/1987 | Gilbert et al. |
| 4,712,363 A | 12/1987 | Claborn |
| 4,724,632 A | 2/1988 | Bilsland et al. |
| 4,726,176 A | 2/1988 | McGrew |
| 4,736,573 A | 4/1988 | Seck |
| 4,756,146 A | 7/1988 | Rouse |
| 4,756,147 A | 7/1988 | Savell |
| 4,756,148 A | 7/1988 | Gander |
| 4,796,415 A | 1/1989 | Moore |
| 4,805,306 A | 2/1989 | Baba |
| 4,819,333 A | 4/1989 | Baba |
| 4,823,542 A | 4/1989 | Klever et al. |
| 4,829,755 A | 5/1989 | Nance |
| 4,852,258 A | 8/1989 | Foster |
| 4,856,194 A | 8/1989 | Lee |
| D304,728 S | 11/1989 | Piorkowski |
| 4,879,869 A | 11/1989 | Buckendorf, Jr. |
| 4,891,931 A | 1/1990 | Holland |
| 4,905,465 A | 3/1990 | Jones et al. |
| 4,914,899 A | 4/1990 | Carmine |
| 4,922,694 A | 5/1990 | Emoto |
| 4,926,557 A | 5/1990 | Haupt |
| 4,936,886 A | 6/1990 | Quillen |
| 4,945,717 A | 8/1990 | Schaffer |
| 4,981,012 A | 1/1991 | Claborn |
| 4,987,681 A | 1/1991 | Sepke |
| 4,989,321 A | 2/1991 | Hoffmann |
| 5,010,649 A | 4/1991 | Hoffmann |
| 5,020,224 A | 6/1991 | Haupt |
| 5,023,998 A | 6/1991 | Masciarella et al. |
| 5,029,435 A | 7/1991 | Buchanan |
| 5,048,278 A | 9/1991 | Jones et al. |
| 5,060,383 A | 10/1991 | Ragkiewich |
| 5,092,112 A | 3/1992 | Buckendorft, Jr. |
| 5,197,264 A | 3/1993 | Lacey |
| 5,222,750 A | 6/1993 | Ellis |
| 5,263,303 A | 11/1993 | Stroud |
| 5,276,969 A | 1/1994 | Luick |
| 5,279,102 A | 1/1994 | Foster |
| 5,287,683 A | 2/1994 | Smith |
| 5,303,476 A | 4/1994 | Tuggle |
| 5,309,701 A | 5/1994 | McGuerty |
| 5,345,683 A | 9/1994 | Kanou |
| 5,398,416 A | 3/1995 | Mackey |
| 5,404,644 A | 4/1995 | Needham et al. |
| 5,406,708 A | 4/1995 | Stephens et al. |
| 5,408,816 A | 4/1995 | Cartier |
| 5,430,943 A | 7/1995 | Lee |
| 5,433,006 A | 7/1995 | Taguchi |
| 5,449,140 A | 9/1995 | Lastowski |
| 5,450,715 A | 9/1995 | Murray |
| 5,490,641 A | 2/1996 | Worthing |
| 5,493,783 A | 2/1996 | Oostendorp |
| 5,493,785 A | 2/1996 | Lawrence |
| 5,522,140 A | 6/1996 | Sugihara et al. |
| 5,522,141 A | 6/1996 | Sugihara et al. |
| 5,526,572 A | 6/1996 | Sugihara et al. |
| 5,577,374 A | 11/1996 | Huston |
| 5,603,205 A | 2/1997 | Foster |
| 5,613,354 A | 3/1997 | Foster |
| 5,626,006 A | 5/1997 | Fricke, Sr. |
| 5,644,844 A | 7/1997 | Pink |
| 5,651,418 A | 7/1997 | Jerez |
| 5,657,542 A | 8/1997 | White, III et al. |
| 5,671,536 A | 9/1997 | Everts et al. |
| 5,675,897 A | 10/1997 | Berfield |
| 5,722,172 A | 3/1998 | Walden |
| 5,743,019 A | 4/1998 | Berfield |
| 5,749,148 A | 5/1998 | White, III et al. |
| 5,758,424 A | 6/1998 | Iacona et al. |
| 5,761,892 A | 6/1998 | Quiroga |
| 5,765,287 A | 6/1998 | Griffini et al. |
| 5,771,670 A | 6/1998 | Perry |
| 5,787,693 A | 8/1998 | Duke |
| 5,806,192 A | 9/1998 | Everts et al. |
| 5,829,236 A | 11/1998 | Ballard et al. |
| 5,836,142 A | 11/1998 | Maxwell |
| 5,836,227 A | 11/1998 | Dees, Jr. et al. |
| 5,839,262 A | 11/1998 | Sorensen |
| 5,850,728 A | 12/1998 | Rappolt |
| 5,852,876 A | 12/1998 | Wang |
| 5,862,598 A | 1/1999 | Lee |
| 5,867,911 A | 2/1999 | Yates et al. |
| 5,881,464 A | 3/1999 | Collins |
| 5,881,465 A | 3/1999 | Brandt et al. |
| 5,887,348 A | 3/1999 | Iacona et al. |
| 5,890,352 A | 4/1999 | Molina |
| 5,896,666 A | 4/1999 | Iacona et al. |
| 5,901,448 A | 5/1999 | Lingerfelt |
| 5,970,692 A | 10/1999 | Foster |
| 5,970,694 A | 10/1999 | Knox, Jr. |
| 5,979,064 A | 11/1999 | Kitz et al. |
| 5,987,756 A | 11/1999 | Yates et al. |
| 5,996,233 A | 12/1999 | Morabit et al. |
| 6,108,914 A | 8/2000 | Sheldon |
| 6,148,523 A | 11/2000 | Everts et al. |
| 6,401,344 B1 | 6/2002 | Moore |
| 6,519,857 B1 | 2/2003 | Proulx |
| 6,581,292 B2 | 6/2003 | Allis |
| 6,666,009 B1 | 12/2003 | Brandon |
| 7,111,403 B2 | 9/2006 | Moore |

HEAD FOR A ROTARY LINE TRIMMER APPARATUS

FIELD OF THE INVENTION

This invention relates to flexible rotary line trimmers. In particular, this invention relates to a balanced head for a rotary line trimmer in which a metal tube is provided in the head surrounding the trimming line to prevent frictional welding and premature failure of the line and the head. Further the invention relates to a removable cartridge that creates a path for the trimming cutting line and which may be easily removed for cleaning and periodic maintenance.

BACKGROUND OF THE INVENTION

Rotary line trimmers are widely used for cutting grass, weeds and other plants in the upkeep of lawns and generally clearing vegetation. Line trimmers are typically characterized by a flexible nylon trimming line attached to a rotatable head. The head is attached to a motor shaft which is rotated at high speeds, typically by trigger operation of a small gasoline engine or electric motor. When the head is rotated, the rotating trimming line serves as a cutting blade to cut grass, weeds or other vegetation. The length of the cutting line extending from the head determines the overall diameter of the cutting path.

During use of line trimmers the cutting line often becomes worn and breaks off, eventually requiring replacement. Often the cutting line fails at the point where the cutting line extends from the head. One cause is the scoring of the cutting line from sharp or discontinuous surfaces on the head itself. Another cause is stress fractures caused by repeated bending of the cutting line during use. Still another cause is heating of the cutting line due to repeated bending, resulting in softening of the cutting line. Additionally, the heating of the cutting line can fuse the cutting line to the plastic surfaces of the head requiring replacement of the head or dismantling the head to remove the fused cutting line.

An additional problem in the prior art occurs after extended use of the line trimmer. The inventor has observed that after extended use, the line trimmer head collects a substantial amount of dirt, debris and plant matter both on the outside and inside of the trimming head. The problem is exacerbated by the presence of lubricating oils and greases typically used in line trimmers and which have a tendency to build up at the line trimming head. In most cases, the debris builds up to the point where it interferes with the mechanical operation of the trimming head.

An additional problem in the prior art occurs because the internal working components of the head are generally exposed to the external environment in which the line trimmer is operating. The external environment can include corrosive salt water, sand and salt residue typically found in coastal environments in which line trimmers are often used. Exposure to caustic environments can cause premature failure of the internal working components because of corrosion and salt residue buildup.

In prior art examples which include locking blades, the button used to bias the cutting line clamp becomes inoperable as its freedom of movement is blocked by a buildup of debris or corrosion. As the old soiled cutting line is removed from the head, one end must be pulled through the head. As the used cutting line is pulled through the head, dirt, excess vegetation and salt debris are pulled through the head as well. The debris is dislodged inside the head, it eventually blocks the movement of the locking blades requiring tedious cleaning of the internal parts or complete replacement of the entire head.

Still a further problem involves excessive wear of the plastic edges where the cutting line contacts the head. After prolonged use, the contact point(s) where the cutting line exits the line trimming head become jagged. The jagged edges wear the cutting line rapidly causing frequent failure and excess welding of the cutting line to the head. In most cases, the failures of the cutting line became so frequent that the entire head must be discarded.

Still another problem is friction caused by rotational imbalance in the line trimmer head. Various line trimmers in the prior art have not been adequately balanced about the axis of rotation of the line trimmer shaft. The imbalance results in vibration in the head which further results in additional friction at the exit portal for the cutting line. Additional friction results in premature wear of the head and premature failure of the cutting line.

Still a further problem in prior art trimming heads is insubstantial weight of the head. Line trimmers derive a significant amount of their effectiveness from the high speed of rotation of the trimming head. Maintaining the high speed during use requires a significant amount of energy. In use, cutting vegetation absorbs energy and has a tendency to slow the rotation of the head forcing the user to repeatedly back away from cutting to reestablish sufficient rotational speed. Maintaining sufficient rotational speed during use therefore requires larger engines and fuel tanks. However, most line trimmer heads of the prior art are made from injected molded plastic and therefore are of significantly light weight. The light weight of the prior art heads reduces the amount of rotational inertia needed to store energy. Some line trimmer heads of the prior art are provided with counterweights; however, the positioning of the counterweights has not been ideal or sufficient and has lead to other problems such as vibration.

Rotary line trimmer apparatus incorporating single length cutting lines having heads of various designs are known in the art.

U.S. Pat. No. 5,303,476 to Tuggle discloses a line head for a rotary line trimmer apparatus that securely holds a single cutting line. The apparatus includes a head with raised portions on its underside that define two channels. A bail including a clasp and a lip is recessed in the first channel. A length of cutting line is recessed in the second channel. The bail rotates between an open position facilitating insertion of the cutting line and a closed position designed to hold the cutting line during operation. While this apparatus secures a cutting line, it does not prevent premature cutting line breakage or minimize failure from accumulated debris.

U.S. Pat. No. 6,401,344 to Moore et al. discloses a head for a line trimming apparatus that includes a sliding cutting line clamp and generously curved cutting line contact points. The apparatus defines a pair of clamp arms that extend through a cutting line channel and secure a cutting line in the cutting line channel. The cutting line clamp is normally biased with a spring in the clamping position whereby the clamp arms press the cutting line against the cutting line channel. While the '344 patent discloses a method to more easily replace a trimming cutting line it does not address the issue of premature cutting line breakage due to heating or the issue of fusing of the cutting line to the internal plastic parts of the head.

U.S. Pat. No. 7,111,403 to Moore also discloses a head for a line trimming apparatus with a set metal inserts partially forming a cutting line channel. The inserts are sandwiched between upper and lower body sections of the head and provide a partial contact surface for the cutting line's lateral surfaces. A problem with the design disclosed in the '403 patent is that the cutting line tends to fuse to the internal plastic surfaces above and below the metal inserts. Also the minute gap that exists between inserts and the internal plastic surfaces creates a discontinuity in the cutting line channel which generates friction with the cutting line during use and results in the cutting line fusing itself to that gap and the internal plastic surfaces. The discontinuities also invite fouling and corrosion due to their tendency to scrape off dirt and debris from the cutting line inside the head.

SUMMARY OF THE INVENTION

The present invention provides an improved head for a flexible line trimmer that addresses the premature breaking and fusing of the cutting line due to the cutting line's increased temperature caused by the friction between the cutting line and the rotating head. The present invention also addresses the problem of excessive debris build up and premature failure of the head by damage to the cutting line exit portal.

The present invention also addresses the problem of insufficient head weight and injected molded plastic housings and imperfections in the counterweight balance which leads to inefficient cutting and vibration.

A preferred embodiment is characterized by a molded plastic housing including continuous metal tubing that extends through the head and receives a trimming cutting line of selected length. The cutting line is releasably clamped in the tube and extends out from opposite sides of the head. At the cutting line insertion point leading the cutting line into the tube is a convex frustroconical shaped eyelet. The eyelet engages the cutting line during rotation of the head and prevents excessively acute or sharp bending of the cutting line. The combination of the eyelet and the tubing creates a continuous metal surface surrounding the cutting line isolating the internal parts of the head from the environment and the cutting line from contact with the plastic portions of the head. The tube and eyelet eliminates the possibility of the cutting line fusing to the plastic surfaces of the head due to heating caused by friction. The metal eyelet also prevents the opening edges from becoming uneven and prematurely damaging the cutting line.

The head is also characterized by a pair of matched perimeter counterweights. The even distribution of mass at the perimeter of the rotating head effectively stores kinetic energy and allows a smaller diameter head to function as if it were bigger and/or heavier. The smaller diameter head provides for an increased length of cutting line to be exposed during operation, which ultimately prolongs operating time between replacements and provides a greater cutting area than previously possible with similarly sized heads of the prior art. The weighted interior perimeter counterbalance also allows for the use of a lighter, more economical, less powerful engine to rotate the head. Further, smaller, lighter fuel tanks are necessary thereby decreasing the overall operational weight of the line trimmer. The interior perimeter counterbalance also serves to dissipate the heat generated by the friction between the cutting line and the opening in the head which further reduces wear and premature failure of the cutting line.

In one embodiment, the metal tubing is characterized by a removable cartridge. The removable cartridge can be replaced when the exit ports become worn thereby extending the useful life of the head. The removable cartridge also serves to prevent fouling of the integral components of the head by effectively isolating the interior of the head from debris and promotes efficient cleaning of the head after prolonged use.

The present invention also provides a head for a line trimmer characterized by a body and a cover which are typically secured to a motor shaft of a line trimmer and encloses a sliding cutting line clamp which receives a trimming cutting line of selected length and thickness.

In one embodiment the cutting line clamp is characterized by a single clamp arm which extends from a clamp base through the metal tube in which the cutting line resides. The cutting line clamp has a clamp slot and is normally biased in a clamping position in which the clamp arm presses the trimming cutting line against the interior of the metal tube. The clamp slot is of varying radii to accommodate different styles of cutting line.

In another embodiment of a head in accordance with the invention, the cutting line clamp comprises two spaced apart clamp arms that are engageable with a cutting line to forcibly urge the cutting line against the interior of the metal tube. Both clamp arms have a clamp slot through which the cutting line passes. A spring biases the cutting line clamp in a clamping position in which the clamp arms press the cutting line against the interior of the metal tube such that the cutting line is secured.

In another embodiment of this invention a head for a rotary line trimmer is provided that includes a convex funnel shaped eyelet incorporated into the exit portals of the metal tube or into the perimeter counterweight that guides the cutting line during rotation of the head preventing the cutting line from contacting exterior plastic surfaces of the head during operation and fusing.

Those skilled in the art will further appreciate the above-mentioned features and advantages of the invention together with other important aspects thereof upon reading the detailed description that follows in conjunction with the drawings.

BRIEF DESCRIPTION OF THE DRAWINGS

In the detailed description of the preferred embodiments presented below, reference is made to the accompanying drawings.

DETAILED DESCRIPTION OF THE PREFERRED EMBODIMENT

Figure 1:
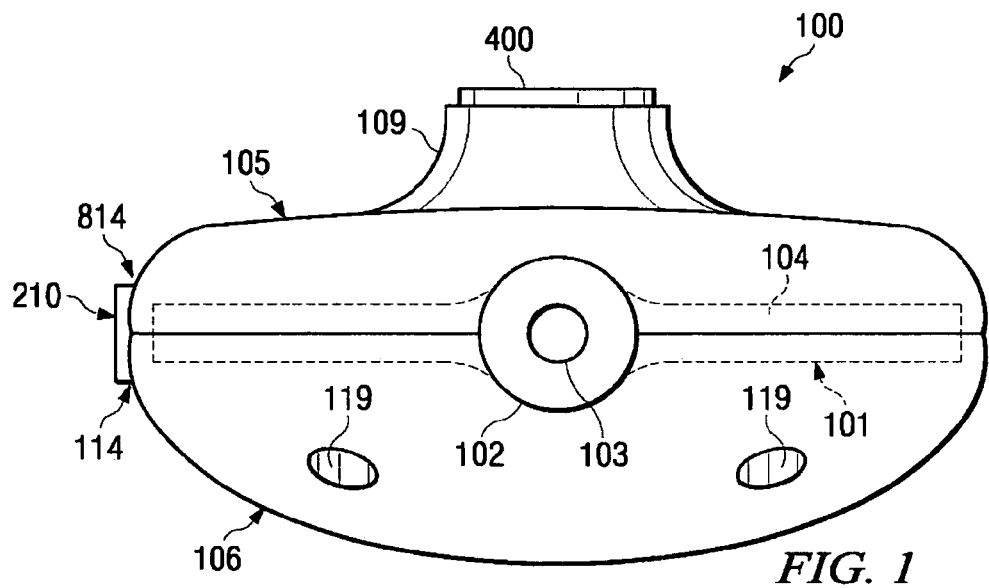
FIG. 1 is an elevation view of an assembled head of a preferred embodiment of the invention including upper and lower covers.
Figure 2:
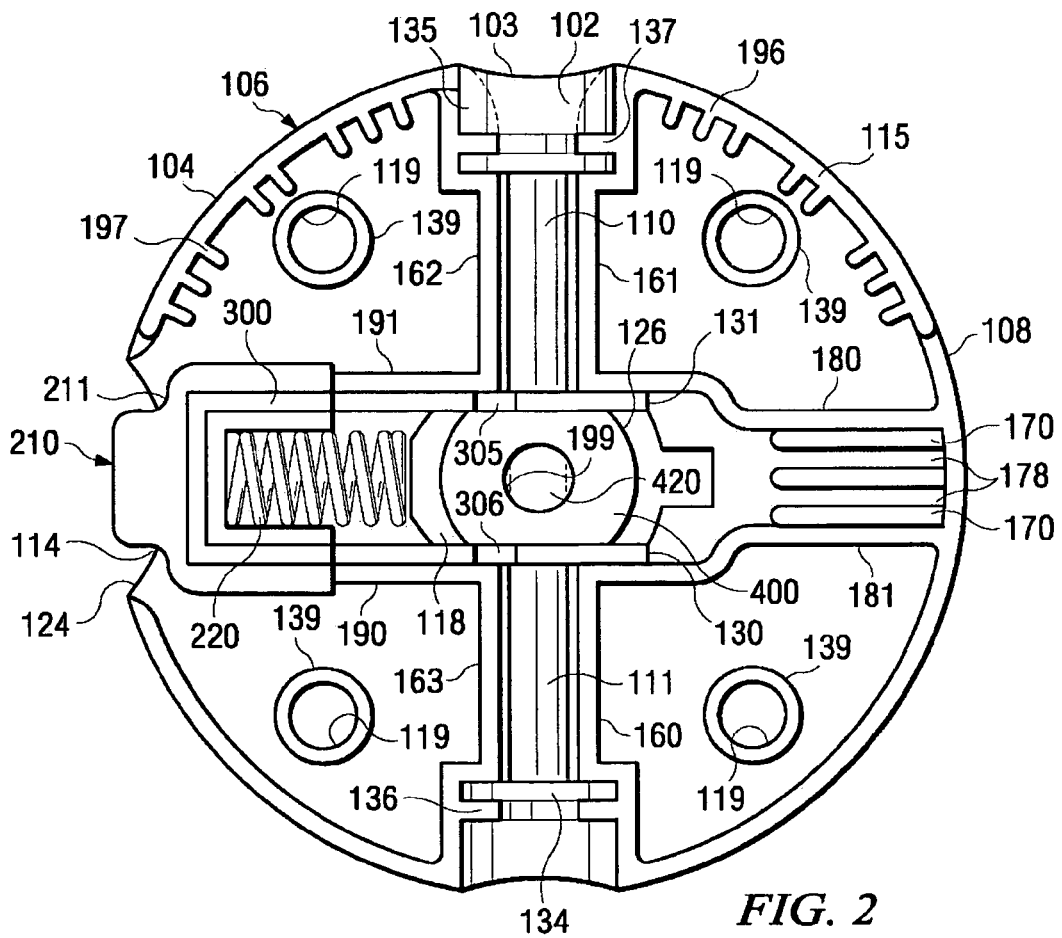
FIG. 2 is a plan view of the lower cover of the preferred embodiment of the invention.
Figure 3:
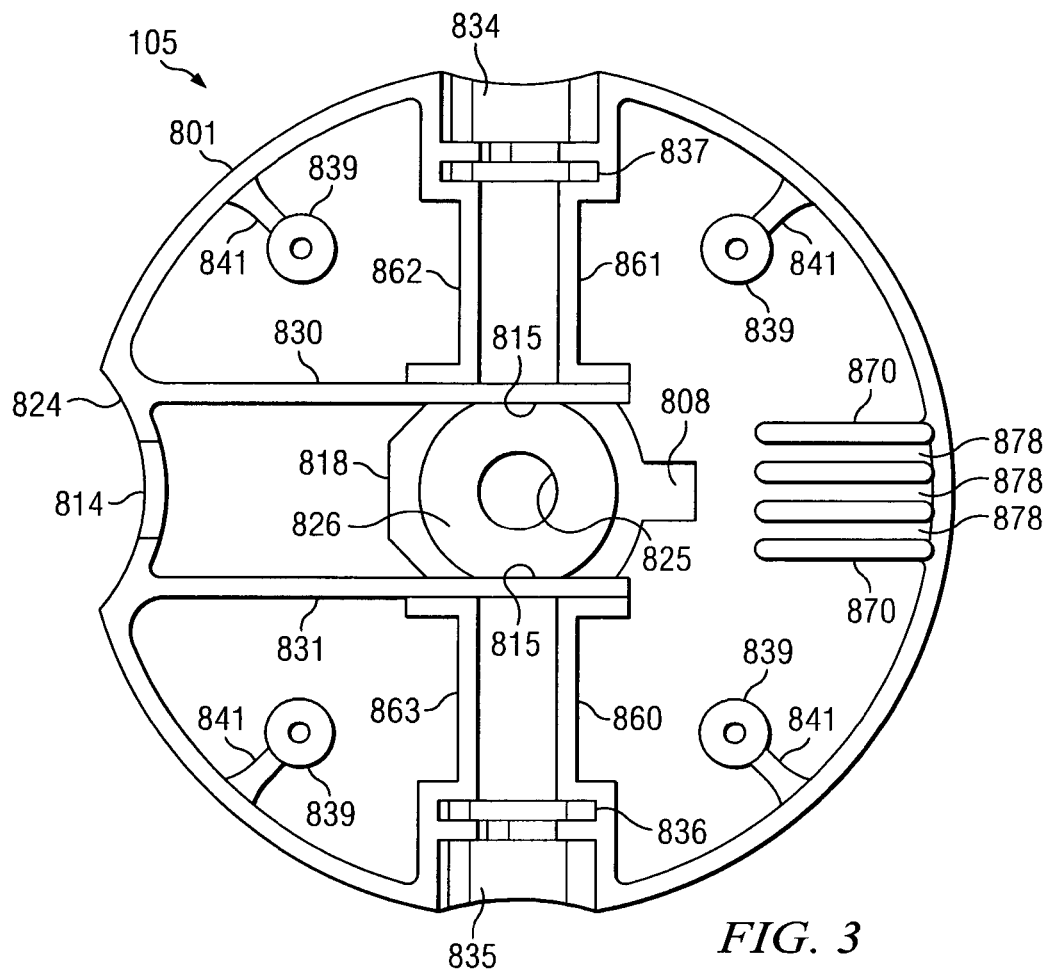
FIG. 3 is a plan view of the upper cover of the preferred embodiment of the invention shown in FIG. 1.

Referring to FIGS. 1, 2 and 3, a preferred embodiment of a head for a rotary line trimmer is shown. Head 100 has a generally disk-like housing formed by upper cover 105 and lower cover 106. The housing in the preferred embodiment is constructed of injection molded nylon. Other materials with suitable strength and rigidity to maintain the positions of internal parts can be used such as fiberglass and polypropylene. Head 100 has two diametrically opposed openings where the single cutting line protrudes. Head 100 mounts on the threaded rotating drive shaft of a typical rotary line trimmer by way of an arbor 400. Arbor 400 is provided with an arbor hole 420 and is threaded to accept the lower portion of the line trimmer drive shaft. In an alternate embodiment the drive shaft passes through the head by way of a shaft hole and is secured to the head with a shoulder bolt (not shown). Upper cover 105 has a rounded exterior shape and a generally flat top surface including arbor hub 109 defining a circular opening through which arbor 400 extends. Button opening 814 and button indention 824 when mated with button opening 114 and button indention 124 create a depressed, rectangular aperture through which button 210 extends.

Lower cover 106 has a rounded exterior shape defined by housing 108 and a generally domed surface including four stanchion holes 119. Lower cover 106 includes two diametrically opposed eyelet slots 134 and 135, each forming a semicircular impression. Eyelet support ribs 136 and 137 are also provided. The eyelet slots and support ribs also form seats for the arcuate counterweights. In FIG. 1 a single arcuate counterweight is shown so that the details of eyelet slots and support ribs can be seen. In the preferred embodiment, two identical arcuate counterweights are provided mounted at opposite sides of the head and providing diametrically opposing eyelet openings. Arcuate counterweight 101 includes eyelet 102 and arcuate projections 104 and 115. The arcuate projections can be provided with fins 196 and 197 on their internal surfaces to aid in dissipation of heat generated by friction of the cutting line. Eyelet opening 103 is defined by a convex frustroconical surface leading to the cutting line channel. The arcuate counterweights in the preferred embodiment are cast metal parts constructed of an iron alloy. Furthermore, in the preferred embodiment, each arcuate counterweight weighs approximately 4 to 8 ounces. Other alloys will suffice, such as steel, aluminum, iron, copper, bronze or titanium.

Cutting line tubing sections 110 and 111 are seated in the channel formed by channel walls 160, 161, 162 and 163 and are adjacent to and share a central axis with both eyelets of the diametrically opposed pair of arcuate counterweights. Cutting line tubing sections 110 and 111 are hollow tubes made of aluminum, steel, brass or copper. In the preferred embodiment the tubing sections are about 0.060 inch thick and of sufficient inside diameter to receive cutting line having a diameter of up to about 0.155 inches. The eyelets provide a smooth convex frustroconical surface at the exits for the line on opposing sides of head 100. The smooth surfaces surround the cutting line during operation eliminating any material discontinuity and irregular surface from contacting the cutting line. A channel hole 199 is provided through arbor 400 which, in cooperation with the tubing, forms a complete and circumferentially continuous metallic channel for the cutting line from one eyelet to the other. In addition to forming the channel which houses cutting line tubing sections 110 and 111, channel walls 160, 161, 162 and 163 add rigidity and structure to lower cover 106. Channel walls 160 and 161 abut button guide 191 and housing support 180 at generally right angles. Channel walls 160 and 163 abut housing support 181 and button guide 190 at generally right angles. Housing supports 180 and 181 are adjacent to counterweights 170 and are integrally formed with housing 108. Button guides 190 and 191 are generally perpendicular to the channel walls and form a support track on which button 210 travels. Locking blade receiving supports 130 and 131 for a support track on which locking blade 300 moves. Three counterweights 170 are equidistant from each other and extend upwards into upper cover 105. In between counterweights 170 are counterweight receiving slots 178.

Lower cover 106 also includes four stanchions 139 located in each quadrant of lower cover 106 and each with stanchion hole 119. When assembled, self locking screws fit through stanchion holes 119 and into stanchion 839 in upper cover 105. The self-locking screws are a self-tapping, PLASTITE® screw provided, in the preferred embodiment, by Textron Fastener Systems, Inc. of Decorah, Iowa. Stanchions 839 are not threaded, and upon assembly of upper cover 105 and lower cover 106, seal around the self-locking screws to prevent the screws from backing out during operation of the head.

Figure 5:
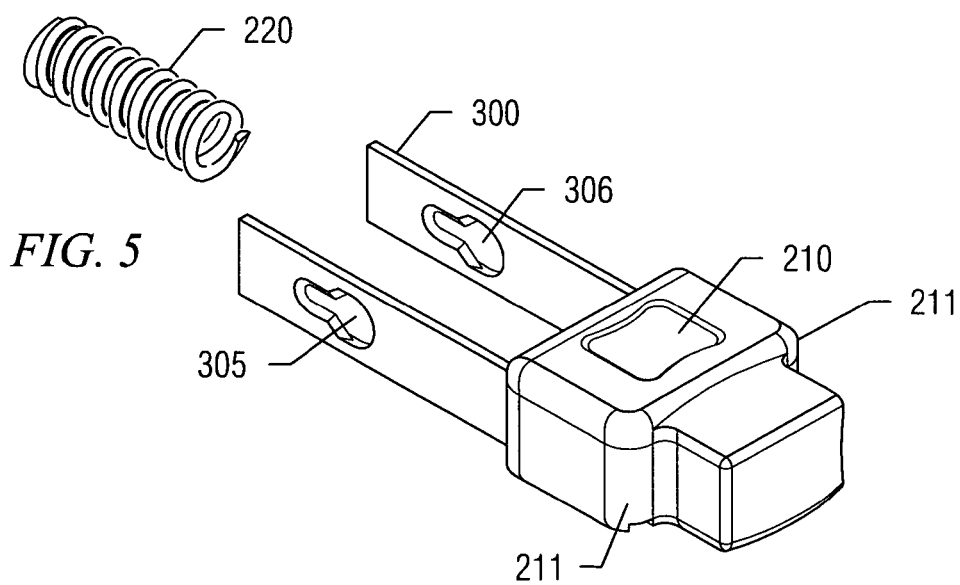
FIG. 5 is an isometric view of a dual locking blade, a spring, and a button.
Figure 6:
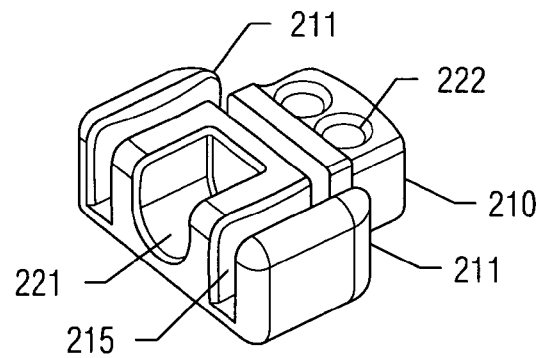
FIG. 6 is an isometric view of the underside of a button.
Figure 7:
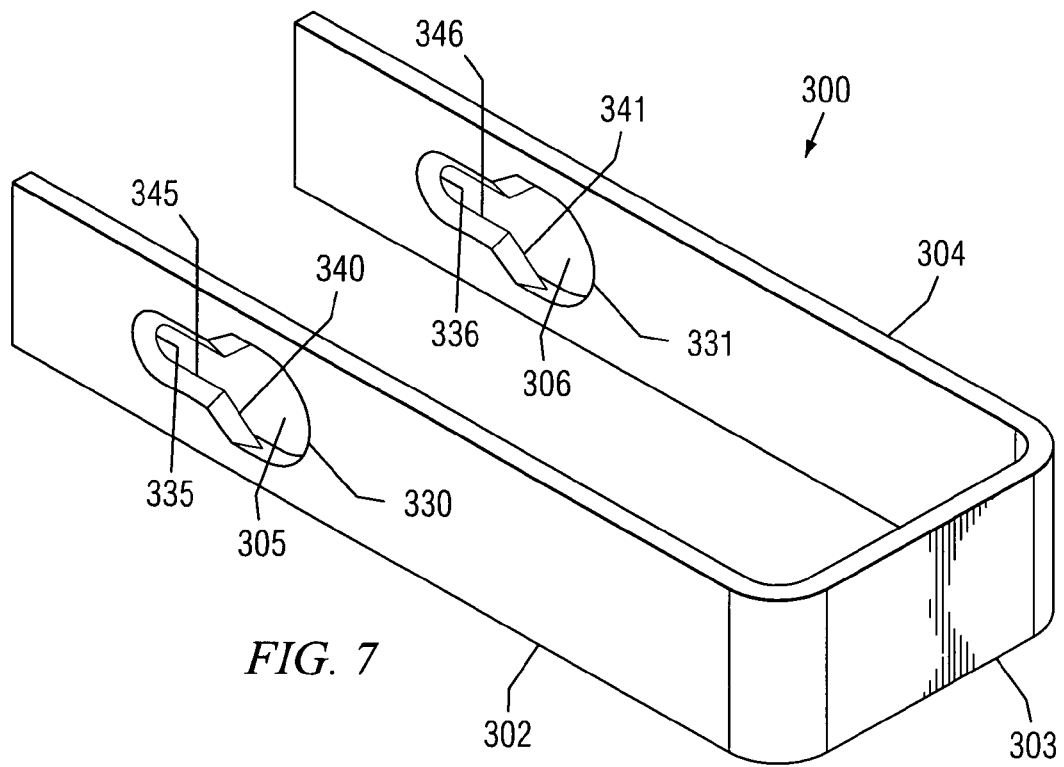
FIG. 7 is an isometric view of a locking blade.

Still referring to FIGS. 1, 2 and 3 and further to FIGS. 5, 6, and 7, button 210 and locking blade 300 are shown. Button 210 includes button shoulders 211, locking blade receiving slot 215, spring receiving slot 221, and holes 222. In the preferred embodiment, locking blade 300 is a U-shaped metal piece, which can also be formed of a metal laminate or alloy. Stainless steel or titanium is used in the preferred embodiment. Locking blade 300 includes arms 302 and 304 and a top 303. In the preferred embodiment, arms 302 and 304 and top 303 are formed in one piece. Each arm is provided with clamp slots 305 and 306. The clamp slots are concentrically aligned. Clamp slot 305 is comprised of a first radius 330 and a second radius 335 placed at opposite ends of clamp slot 305. Clamp slot 306 is comprised of a first radius 331 and a second radius 336. The length of the slots is determined by the diameter of cutting line tubing sections 110 and 111. In the preferred embodiment the slots are about 0.25 inches in length. First radii 330 and 331 and second radii 335 and 336 are connected by angular indentions 340 and 341, respectively, and locking surfaces 345 and 346, respectively. The locking surfaces create angular steps from the first radii to the second radii. The first radii are larger than the second radii by approximately thirty percent. In the preferred embodiment, the first radii are 0.093 inches and the second radii are 0.037 inches. In the preferred embodiment, angular indentions 340 and 341 make an angle of thirty-four to thirty-six degrees from the long axis of the arm in which it is placed, but other oblique angles will also function properly. The purpose of the stair step locking surfaced and angular indention is to accommodate differing sizes of cutting line when the head is assembled.

When assembled, spring 220 fits in spring receiving slot 221 of button 210. The arms 302 and 304 of locking blade 300 slide along locking blade guides 830 and 831 of upper cover 105 and locking blade receiving supports 130 and 131 of lower cover 106. When the housing is assembled, spring seat 118 and spring seat 818 form a single shelf capable of supporting the bias force of spring 220. One end of spring 220 is placed in the shelf and the other end is fitted into spring receiver slot 221 on the bottom. Spring 220 biases the shelf against button 210 forcing button shoulders 211 against the insides of button opening 814 and button opening 114 when upper cover 105 and lower cover 106 are assembled. The first radii of each clamp slot is placed in concentric alignment with the axes of cutting line tubing sections 110 and 111. The bias provided by spring 220 forces angular indentions 340 and 341 to engage the cutting line in cutting line tubing sections 110 and 111 and force it against channel hole 199 of arbor 400 and the interior of cutting line tubing sections 110 and 111 thereby preventing movement of the cutting line along its axis with respect to the head.

Figure 4:
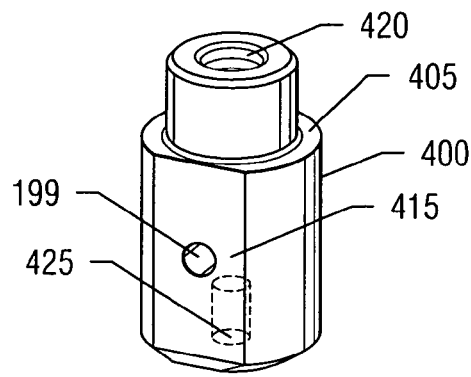
FIG. 4 is an isometric view of the arbor.

Referring now to FIG. 4, the preferred embodiment of the head also includes an arbor 400 having a positioning seat 405, a channel hole 199, flat diametrically opposed faces 415, arbor hole 420 and arbor hole 425. When assembled, arbor 400 is seated on arbor positioning shelf 126 of lower cover 106 and directly below arbor hole 825 in upper cover 105. When assembled, positioning seat 405 fits snugly against arbor positioning shelf 826 on upper cover 105. A self-tapping and self-locking screw fits through lower cover 106 and into arbor hole 425 in arbor 400 to hold arbor 400 firmly in place. Diametrically opposed faces 415 cooperate with arbor positioning faces 815 in upper cover 105 and the opposing inside surfaces of locking blade receiving supports 130 and 131 in lower cover 106 to prevent rotation of the arbor in the head. Channel hole 199 is in concentric alignment with cutting line tubing sections 110 and 111 and the eyelets in the arcuate counterweights. Channel hole 199 is sized to match the inner diameter of the cutting line tubing sections.

Referring to FIG. 3, it can be seen that the shape of upper cover 105 defined by housing 801 is generally a mirror image of lower cover 106. When assembled, the two covers will enclose and hold in place the arcuate counterweights, button 210, spring 220, locking blade 300, and arbor 400. Upper cover 105 includes channel walls 860, 861, 862 and 863 which form the channel that seats cutting line tubing sections 110 and 111. Upper cover 105 also includes two diametrically opposed eyelet slots 834 and 835, each forming a semicircular impression in upper cover 106 and each divided with eyelet support ribs 837 and 836, respectively. Eyelet slots 834 and 835 both seat an eyelet of the pair of arcuate counterweights. The channel walls abut locking blade guides 830 and 831 at approximate right angles. When the housing is assembled, the inside surfaces of locking blade guides 830 and 831 provide flat surfaces which abut the flat diametrically opposed faces 415 of arbor 400 and prevent the arbor from rotating during operation. Arbor support 808 is a support with an arcuate shaped interior surface that aligns and positions arbor 400. Upper cover 105 further includes four stanchions 839 which are additionally supported by stanchion ribs 841 and which correspond to stanchions 139. Additionally, upper cover 105 includes four structural counterweights 870 and defines counterweight receiving slots 878. Arbor positioning shelf 826 defines the opening of arbor hole 825.

Housing 801 of upper cover 105 cooperates with housing 108 of lower cover 106 to form the enclosure for the internal working components of the assembled head. When upper cover 105 and lower cover 106 are assembled, counterweights 170 matingly interface with counterweights 870. Counterweights 870 and counterweights 170 serve a dual purpose. The counterweights offset the weight of locking blade 300 and button 210 and also structurally support the outside of upper cover 105 and lower cover 106. The position of the counterweights prevents sagging or bulging of upper cover 105 and lower cover 106 during operation.

When assembled, each stanchion 839 comes in contact with its stanchion counterpart 119. After assembled, arbor hole 420 of arbor 400 is visible through arbor hub 109. Arbor hole 420 is then secured onto the threaded receiving shaft of a rotary line trimmer.

When the head is assembled, the parabolic shape of the inside of each eyelet prevents wearing and heating of the cutting line from bending when the head is in operation. The eyelets completely surround the cutting line with a circumferentially continuous metal surface and eliminate fusing of the cutting line to head 100 during operation. In use, the arcuate counterweights evenly distribute extra mass to the perimeter of head 100 and thus increase the angular momentum of the head. The additional angular momentum allows the use of a smaller, lighter, and more economical engine or motor to rotate the head without sacrificing cutting performance. The projections provided on the arcuate counterweights also dissipate heat thereby reducing the operational temperature of the cutting line and lengthening the useful life of the cutting line.

In operation, button 210 extends through button openings 814 and 114 and is depressed by the user thereby compressing spring 220 until the central axis of cutting line tubing sections 110 and 111 is aligned with the first radii of the clamp slots in locking blade. A cutting line is inserted through eyelet 102, into cutting line tubing section 110, through a first clamp slot 305, through arbor 400 via channel hole 199, through second clamp slot 306 and cutting line tubing section 111, passing through the second opposing eyelet and exiting the head until the cutting line is evenly exposed out of both diametrically opposed openings in head 100. The user then releases button 210 which allows spring 220 to force button 210 radially outward, in turn moving locking blade 300 radially outward. Clamp slots 305 and 306 engage the cutting line and force it against the inside of channel hole 199 clamping it securely against angular indentions 340 and 341. Each angular indention of each clamp slot engages the cutting line at two distinct points. Locking blade 300 holds the cutting line in place and once the head is rotated, the centrifugal force tends to force locking blade 300 radially outward further securing the cutting line.

Figure 8:
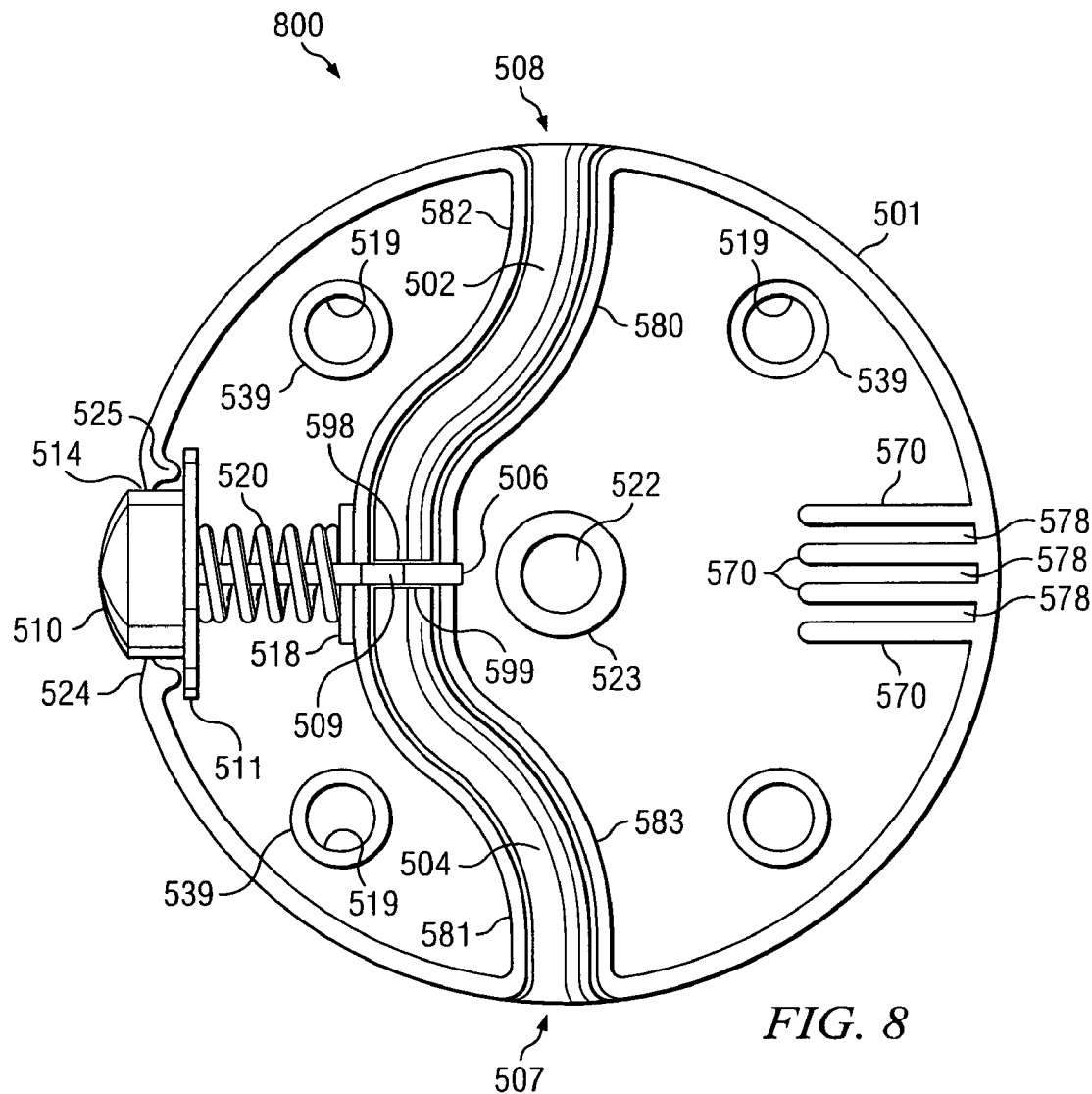
FIG. 8 is a plan view of the lower cover of an alternate embodiment of the invention.

FIG. 8 shows the lower cover of an alternate embodiment of the present invention. Cover 800 is generally circular in shape defined by housing 501 and includes channel retaining walls 580, 581, 582 and 583 which support and locate cutting line tubing sections 502 and 504. Cutting line tubing sections 502 and 504 are metal tubes that have flared ends at channel openings 507 and 508 and opposite ends 598 and 599 that abut locking blade 506. The flared ends form parabolic surfaces of revolution about the axis of the tubing sections. In a preferred embodiment, cutting line tubing sections 502 and 504 are made of a metal material such as aluminum, steel or titanium. Other metals such as copper or brass will suffice. Cover 800 structural supports include stanchions 539, counterweights 570 and trimmer shaft hub support 523. Cover 800 has four stanchions 539 located in the four quadrants of the head and each defining a stanchion hole 519. Cover 800 has four counterweights 570 integrally formed with housing 501 spaced equidistant from each other and define counterweight receiving slots 578. Trimmer shaft hub support 523 defines the circular opening trimmer shaft hole 522. The outside surface of cover 800 also includes button indention 524 and button stops 525 that define button opening 514. Button opening 514 is rectangular in shape and when mated with button opening 914 of cover 900 form a rectangular aperture through which button 510 extends. Button 510 has button shoulders 511 and also includes a single locking blade 506. Locking blade 506 is preferably made of a metal such as aluminum or steel and is generally perpendicular to the support member that defines button shoulders 511. Locking blade 506 is aligned along the diameter that diametrically opposes channel openings 507 and includes clamp slot 509. Clamp slot 509 is similar in dimensions and function to clamp slots 305 and 306 shown in FIG. 7. Spring seat 518 is adjacent to channel retaining walls 581 and 582 and is bisected by locking blade 506. In another embodiment, as shown in FIG. 2, cover 800 can be fitted with a pair of diametrically opposed arcuate counterweights with opposing eyelets concentrically arranged with the axis of cutting line tubing sections 502 and 504.

Figure 9:
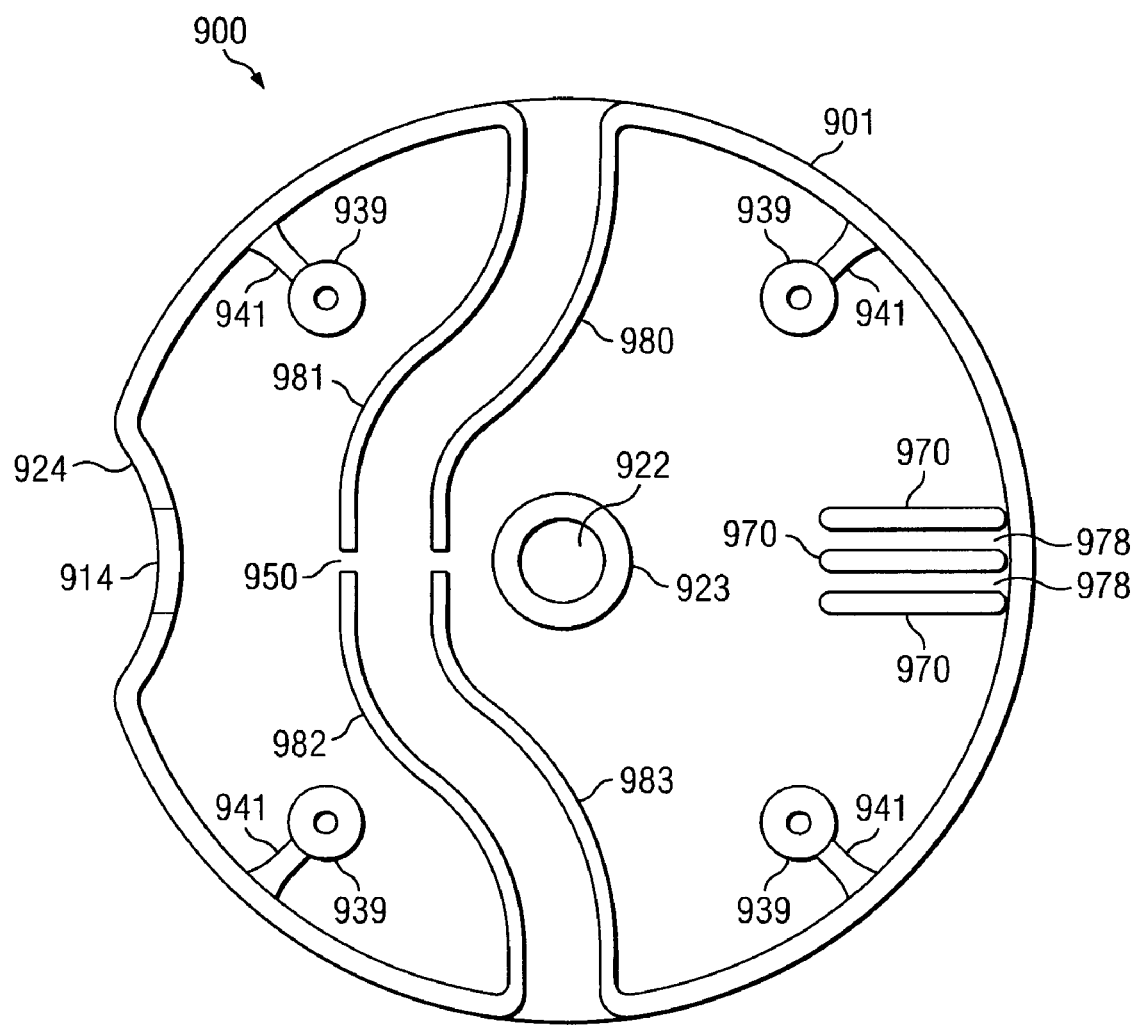
FIG. 9 is the plan view of the upper cover of the embodiment shown in FIG. 8.

FIG. 9 shows upper cover 900 which is designed to fit with lower cover 800. Housing 901 defines the perimeter of cover 900 and cooperates with housing 501 of lower cover 800 to create a snub fit when assembled. Cover 900 includes structural support members channel retaining walls 980, 981, 982, and 983, stanchions 939, counterweights 970, trimmer shaft hub support 923, and button indention 924. Channel retaining walls 980, 981, 982 and 983 define a channel that locates and supports cutting line tubing sections 502 and 504 when the head is assembled. The channel mirrors the generally curved shape of channel retaining walls 580, 581, 582 and 583 and is adapted to form locking blade slot 950. Locking blade slot 950 provides a space for locking blade 506 to pass between cutting line tubing sections 502 and 504.

Stanchions 939 are located so as to cooperate with stanchions 519. Each is supported by stanchion rib 941. Counterweights 970 add structure and rigidity to the head once assembled and also promote even rotation as they offset the weight of button 510 located opposite of counterweights 970 in cover 900. Counterweights 970 extend the full height of the assembled head and define counterweight receiving slots 978. Located directly in the center of the generally circular shaped cover 900 is trimmer shaft hub support 923 that cooperates with trimmer shaft support hub 523 and defines aperture trimmer shaft hole 922.

When assembled, button indention 924 and button opening 914 align with button indention 524 and button opening 514 to create a rectangular opening through which button 510 extends and in use is actuated by a user. Spring 520 abuts against spring seat 518 and in the resting position biases button 510 radially outward towards button opening 514 until button shoulders 511 strike button stops 525. In operation, button 510 is depressed sliding locking blade 506 and clamp slot 509 until the first radius of the clamp slot is aligned with the axes of cutting line tubing sections 502 and 504. A cutting line section is then inserted in channel opening 507, through cutting line tubing sections 502 and 504 of the assembled head and exits out of the opposing channel opening 508 until roughly equal lengths of cutting line are exposed from each of channel openings 507 and 508. Once the desired position of the cutting line is achieved, button 510 is released and spring 520 moves clamp slot 509 radially outward forcing the cutting line to be pinned against the inside surface of cutting line tubing sections 502 and 504.

Figure 10:
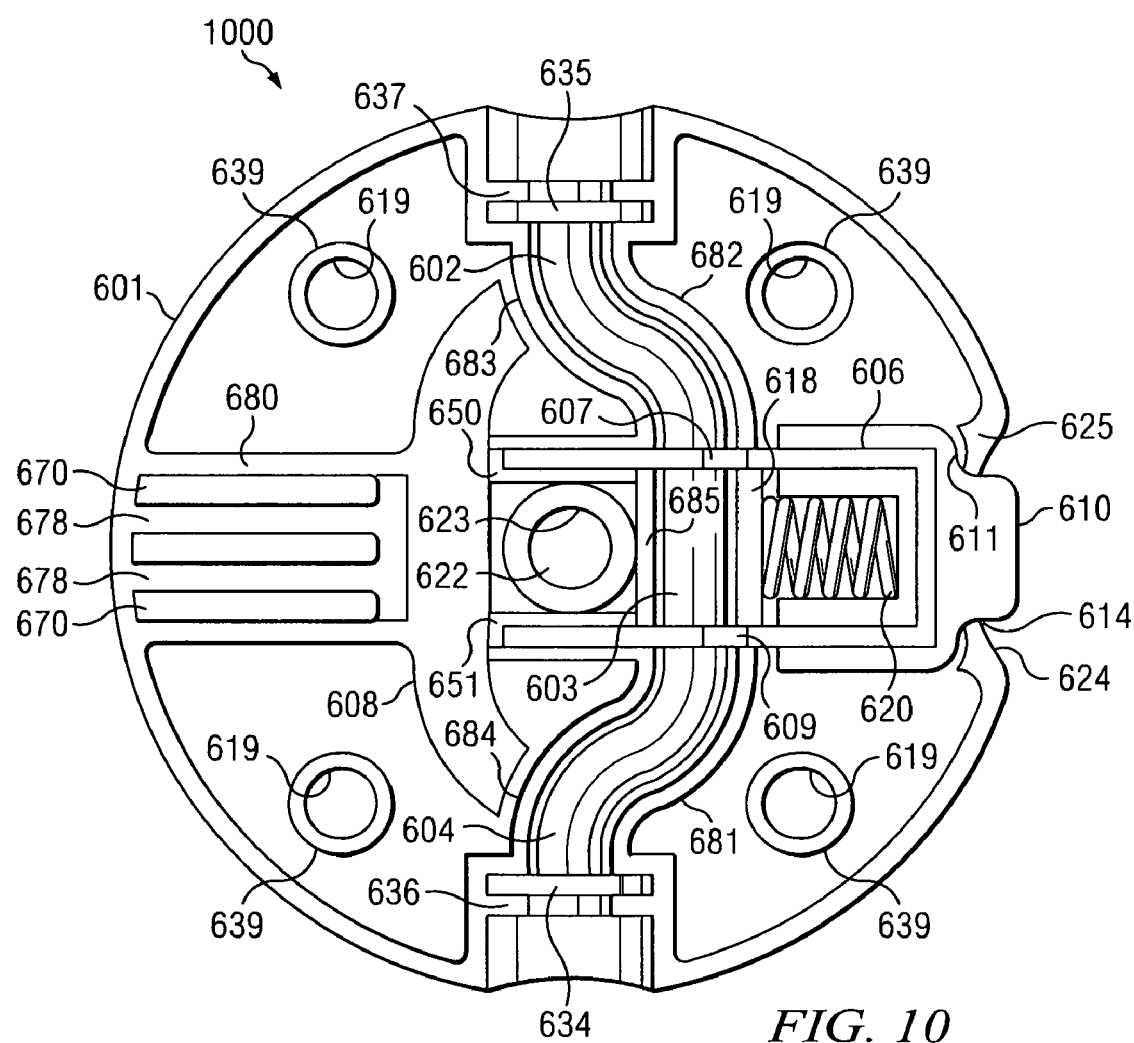
FIG. 10 is a plan view of the lower cover of an alternate embodiment of the invention.

Referring to FIG. 10, the lower cover of an alternate embodiment of the present invention is shown. Cover 1000 has a generally disk-like shape defined by housing 601. Two eyelet slots 634 and 635 are located on opposite sides of the perimeter of cover 1000. Cover 1000 also includes structural members housing counterweight support 680, counterweight 670, molded counterweight 608, channel retaining walls 681, 682, 683, 684, and 685, button stops 625, trimmer shaft hub support 623, and spring seat 618. Molded counterweight 608 is integrally formed with cover 1000 and extends upwards into upper cover 1100. It is formed in a shape to generally mirror the cutting line tubing sections 602, 603 and 604. Its dimensions necessarily depend on the plastic chosen for the housing and the material chosen for the cutting line tubing sections in order to offset the weight of these sections. In the preferred embodiment, the cutting line sections are made of steel tubing and the lower housing is made of nylon. The dimension are such as needed to generate a weight in this embodiment of about 2 to 6 ounces. Eyelet slots 634 and 635 are semicircular shaped indentions bisected by eyelet support ribs 636 and 637 respectively. The eyelet support ribs and eyelet slots define seats for perimeter arcuate counterweights as shown in FIG. 2. The eyelets of the arcuate counterweights are concentrically aligned with the axes of cutting line tubing sections 602 and 604. When assembled the eyelets of the arcuate counterweights and the cutting line tubing section form a circumferentially continuous channel for the cutting line. Channel retaining walls 681, 682, 683, 684, and 685 define a channel that locates and supports cutting line tubing sections 602, 603, and 604 and extends between each eyelet slot 634 and 635 in a curved manner bypassing trimmer shaft hole 622 defined by trimmer shaft hub support 623. Spring seat 618 is located approximately perpendicular to and in between each arm of locking blade 606. Each arm of locking blade 606 includes one clamp slot 607 or 609 located equal distances from an end of locking blade 606. The channel retaining walls extend to the eyelet slots and abut the exterior surface of the arm of the locking blades.

Spring seat 618 is located between the blades of locking blade 606 and defines the portion of the channel that houses cutting line tubing section 603 opposite of channel retaining wall 685. Abutting each end of the channel retaining walls at approximate right angles are locking blade guides 650 and 651. Locking blade guides 650 and 651 form a seat on which the locking blade rests and is guided. Housing counterweight support 680 adds rigidity to cover 1000 and is approximately the same interior height as locking blade guides 650 and 651. Molded counterweight support 608 is integrally formed with the lower cover and extends upward into the upper cover. Housing counterweight support 680 forms a generally rectangular shape enclosing and adjacent to counterweights 670. Counterweights 670 are equidistant from each other and define spaces between each as counterweight receiving slots 678.

Button 610 extends through button opening 614 which is defined by button stops 625. Button indention 624 defines a space that houses button 610 to follow the generally circular perimeter shape to continue while button is biased using spring 620 in an extended position during operation. Button 610 includes button shoulders 611 that during operation abut button stops 625 and prevent button 610 from dislodging from the assembled head. Cover 1000 also includes four stanchions 639 located approximately equidistant from each other in four corners of cover 1000. Stanchions 639 each include and define stanchion holes 619.

Figure 11:
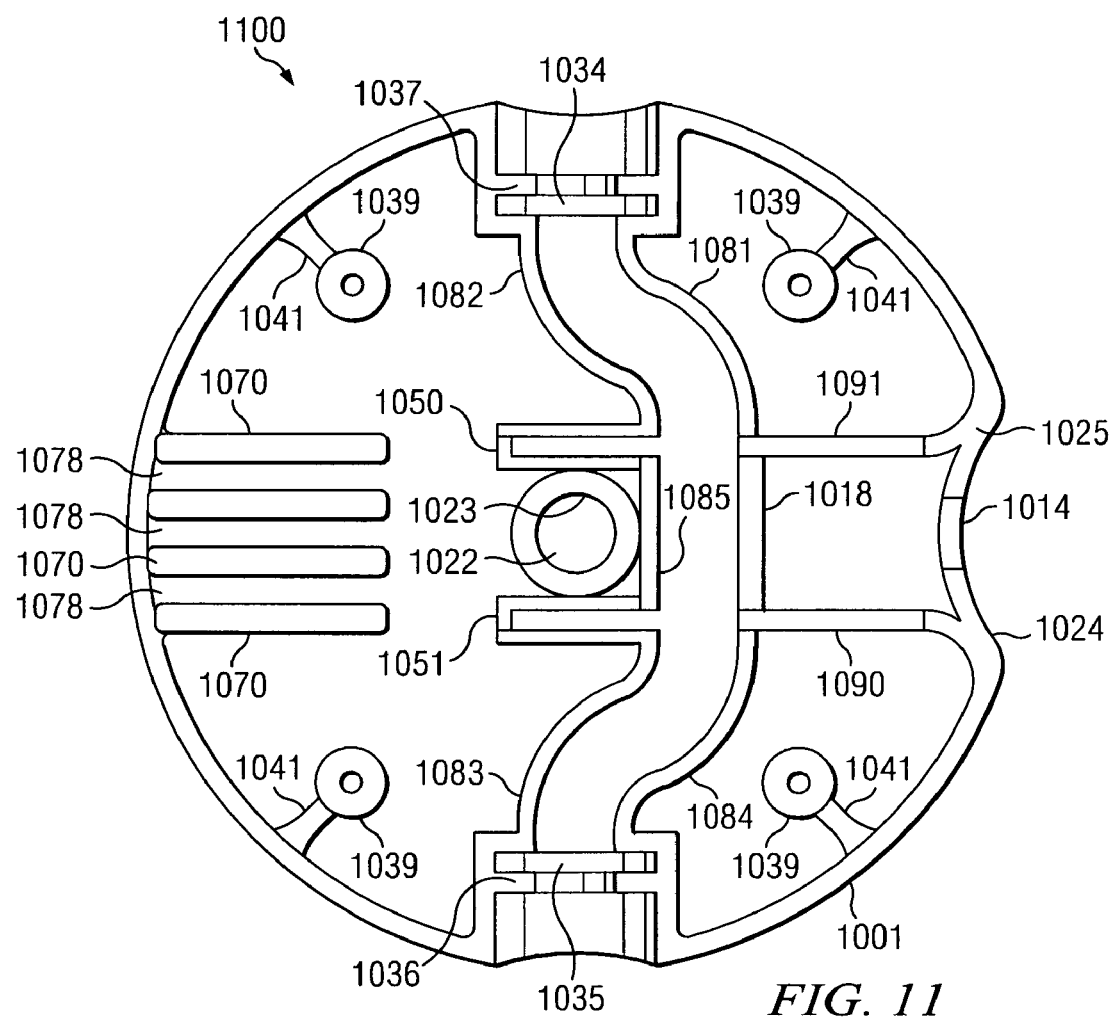
FIG. 11 is the plan view of the upper cover of the embodiment shown in FIG. 10.

FIG. 11 shows the upper cover designed to mate with lower cover 1000. Cover 1100 is generally a mirror image of cover 1000 shown in FIG. 10 designed to fit together to form a line trimmer head and enclose and properly secure the arcuate counterweights, support button 610, spring 620, cutting line tubing sections 602, 603, and 604, and locking blade 606. The generally circular shape of cover 1100 is defined by housing 1001. Channel retaining walls 1081, 1082, 1083, 1084 and 1085 define a semicircular shaped channel that extends from opposite sides of cover 1100 and supports the cutting line tubing sections 602, 603, and 604. Eyelet slots 1034 and 1035 are located at diametrically opposite positions of cover 1100 and form seats for the arcuate counterweights (as shown in FIG. 2). The channel formed by the channel retaining walls bypasses trimmer shaft hole 1022 defined by trimmer shaft hub support 1023. The semicircular indentions that define eyelet slots 1034 and 1035 include eyelet support ribs 1037 and 1036, respectively. Counterweights 1070 provide structure and opposing weight opposite the button mechanism to balance the head during operation. In between counterweights 1070 are counterweight receiving slots 1078 designed to accept counterweights 670 when covers 1000 and 1100 are joined to form an assembled line trimmer head. Locking blade guides 1050 and 1051 provide supports and guides for locking blade 606 and are located adjacent to trimmer shaft hub support 1023 on opposing sides. Locking blade guides 1050 and 1051 are approximately perpendicular to channel retaining wall 1085. Similarly, button guides 1090 and 1091 provide supports for button 610 to slide on and are positioned approximately perpendicularly to spring seat 1018, extending from spring seat 1018 to button stops 1025. Spring seat 1018 defines one side of the channel that houses cutting line tubing section 603 opposite channel retaining wall 1085. Button opening 1014 defined by button indention 1024 forms the opposite half of the aperture button 610 extends through when assembled with cover 1000 and button opening 614 from FIG. 10. Cover 1100 also includes stanchions 1039 located in the approximate four quadrants of cover 1100 and each is supported by stanchion rib 1041 connected to housing 1001.

In operation, housing 601 of cover 1000 and housing 1001 of cover 1100 are fitted together enclosing the internal components arcuate counterweights, cutting line tubing sections 602, 603, and 604, button 610, spring 620, and locking blade 606. Self-tapping screws are inserted through stanchions 639 and into stanchions 1039. The assembled head is attached to a rotary line trimmer by inserting the shaft of the line trimmer through trimmer shaft holes 622 and 1022 and inserting a bolt into the end of the line trimmer shaft. In resting position, spring 620 biases button 610 against spring seats 618 and 1018 to extend through button openings 614 and 1014 until button shoulders 611 abut button stops 625 and 1025. In this position, clamp slots 607 and 609 block the cutting line tubing. Depressing button 610 slides locking blade 606 over locking blade guides 650, 651, 1050, and 1051 and positions clamp slots 607 and 609 such that a cutting line may pass through. Button 610 is released after inserting cutting line through the cutting line tubing and through the clamp slots. Spring 620 forces button 610 and locking blade 606 back to the resting position. Clamp slots 607 and 609 then press the cutting line against the interior surfaces of cutting line tubing sections 602, 603, and 604 to securely hold the cutting line in place.

Figure 12:
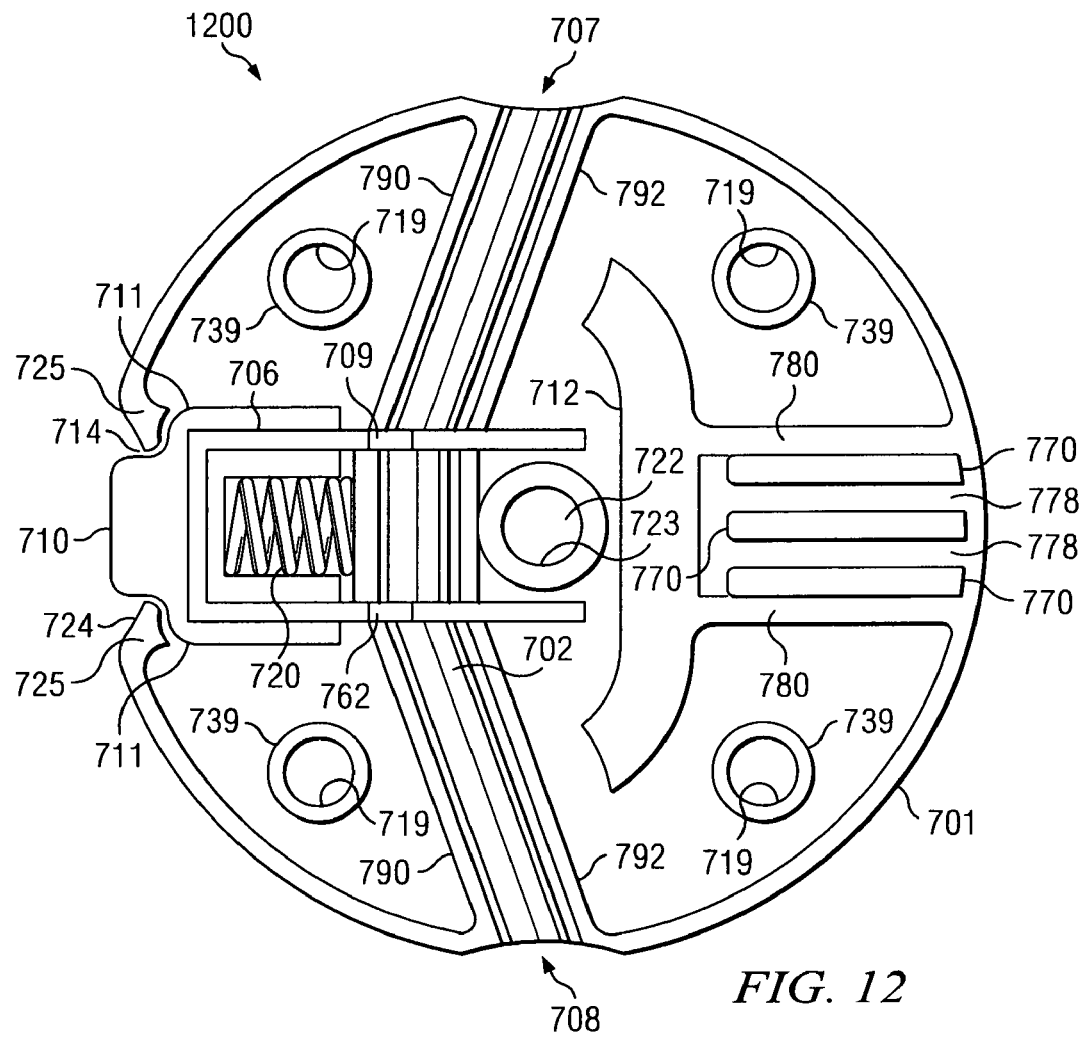
FIG. 12 is a plan view of a lower cover of an alternate embodiment of the invention showing a replaceable modular section.

FIG. 12 shows the lower cover of an alternate embodiment of the present invention. Cover 1200 is generally disk like in shape defined by housing 701 with two cartridge channel openings 707 and 708 located on opposite sides of cover 1200. Channel retaining walls 790 and 792 define a channel that seats removable cutting line tubing cartridge 702. Molded counterweight 712 forms an angular structural shape and abuts channel retaining wall 792 at points on opposite sides of trimmer shaft hub support 723. Molded counterweight 712 is generally shaped to match the angular shape of the replaceable cartridge and is provided with dimensions so that the weight of the plastic from which it is formed equals the weight of the replaceable cartridge. Molded counterweight 712 is formed integrally with lower cover 1200 and extends upwardly into upper cover 1400 when the housing is assembled. Trimmer shaft hub support 723 defines trimmer shaft hole 722. Counterweights 770 are adjacent to housing support 780 and define spaces between counterweights 770 as counterweight receiving slots 778. Four stanchions 739 located approximately in four corners of cover 1200 and equally spaced apart define stanchion holes 719. Button 710 includes button shoulders 711, spring 720, and locking blade 706. Button 710 extends through button opening 714 which is defined by button indention 724 and button stops 725. Included on each blade of locking blade 706 is clamp slot 762 or 709 located an equal distance from the end of the locking blade.

Figure 13:
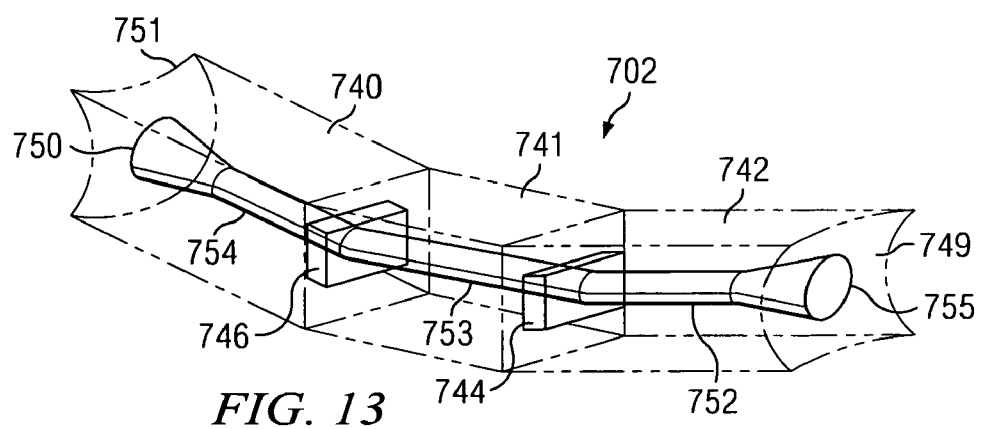
FIG. 13 is an isometric view of the replaceable cartridge.

FIG. 13 is a perspective view of removable cutting line tubing cartridge 702. Removable cutting line tubing cartridge 702 in the preferred embodiment is machined from steel and is removable from the assembled head. Other metals such as titanium, brass, copper or aluminum will also suffice. Removable cutting line tubing cartridge 702 is comprised of three guide sections 740, 741, and 742. Guide section 740 has concave rounded face 751 that defines cartridge opening 750. Rounded face 751 has a concave frustroconical shaped interior surface lessening in diameter as it leads to cartridge channel 754. Cartridge channel 754 connects to cartridge channel 753 which connects to cartridge channel 752 which leads to cartridge opening 755 to form one continuous circular shaped channel through the entire length of removable cutting line tubing cartridge 702. Rounded face 749 defines cartridge opening 755 and is the same shape as rounded face 751. Each of the cartridge openings comprises a parabolic surface of revolution about the axis of the cartridge channel. In another embodiment, the cartridge channel can be curved as it passes through the guide sections forming a smooth arcuate path for the cutting line.

Guide section 740 includes locking blade receiving slot 746, which is sized appropriately to allow the blades of locking blade 706 to pass through removable cutting line tubing cartridge 702. Guide section 740 is adjacent to guide section 741. Guide section 741 is adjacent to guide section 742. Guide section 742 includes locking blade receiving slot 744 that is sized to allow a blade of locking blade 706 to pass through removable cutting line tubing cartridge 702.

Figure 14:
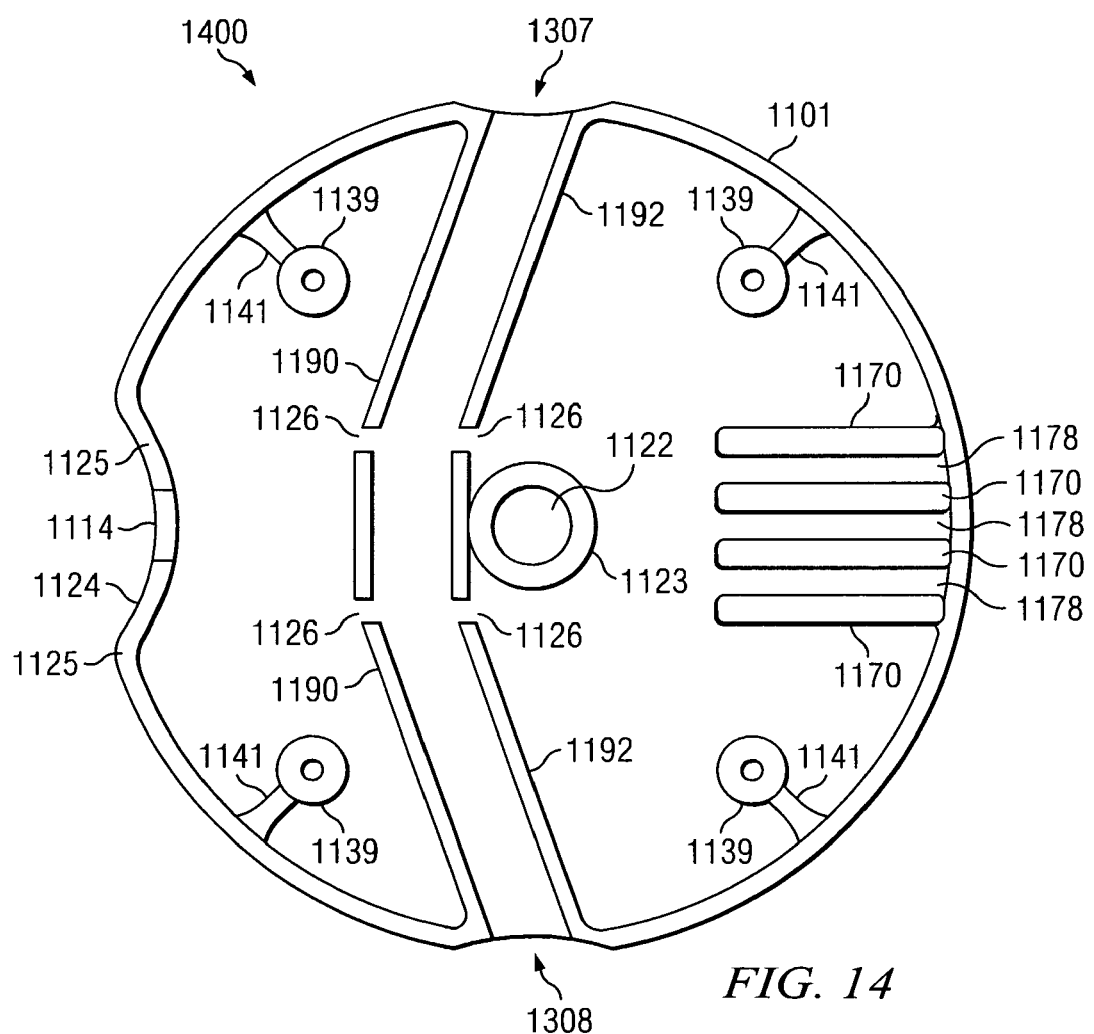
FIG. 14 is the plan view of the upper cover of the embodiment shown in FIG. 12.

Referring to FIG. 14, cover 1400 is an upper cover designed to mate with cover 1200 to form an assembled line trimmer head. Housing 1101 defines the generally circular shape of cover 1400. Cover 1400 includes four stanchions 1139 that are supported by stanchion ribs 1141. Counterweights 1170 add stiffness to cover 1400 and serve to offset the weight of button 710 and locking blade 706 located on the opposite side of the head when assembled. Counterweight receiving slots 1178 are gaps located in between counterweights 1170 and are sized to accept counterweights 770 when the head is assembled. Trimmer shaft hole 1122 is defined by trimmer shaft hub support 1123 and is sized to accept the trimmer shaft from a typical rotary line trimmer apparatus. Channel retaining walls 1190 and 1192 define a channel that runs through cover 1400 from opposing cartridge channel openings 1307 and 1308 located at opposite side of cover 1400. Channel retaining walls 1190 and 1192 are each interrupted twice by locking blade slots 1126. Locking blade slots 1126 are located on channel retaining walls 1190 and 1192 on opposite sides of trimmer shaft hole and are sized to accept the blades of locking blade 706. Button opening 1114 and button indention 1124 when mated with button opening 714 and button indention 724 of cover 1200 create a depressed, rectangular aperture which button 710 extends through. Button stops 1125 located adjacent to button opening 1114 prevent button 710 from passing completely out of the assembled head.

When assembled, housing 701 of cover 1200 and housing 1101 of cover 1400 cooperate with each other to form the assembled head. Cover 1200 and cover 1400 are secured to each other with self-tapping screws inserted through stanchion holes 719 and into stanchions 1139. A trimmer drive shaft from a typical rotary line trimmer is inserted through the head via trimmer shaft holes 722 and 1122. A shoulder bolt (not shown) is inserted into the internally thread end of the trimmer shaft and tightened to secure the assembled head to the trimmer apparatus. In some embodiments, the shoulder bolt is fitted with a flat side to prevent rotation of the head with respect to the drive shaft. To insert a cutting line, button 710 is depressed and locking blade 706 is moved through locking blade receiving slots 744 and 746 of removable cutting line tubing cartridge 702. Due to the bias of spring 720, clamp slots 709 and 762 of locking blade 706 rest in the clamped position. Pressing button 710 moves clamp slots 709 and 762 into the open position ready to accept a cutting line. A cutting line is inserted at either opposing cartridge opening 750 or 755 and passed through the clamp slots while in the open position and out the opposite cartridge opening. When equal lengths of the cutting line extend out of opposing sides of the assembled head, button 710 is released and spring 720 forces button 710 and the clamp slots radially outward. The clamp slots force the cutting line against the cartridge channel and securely hold the cutting line in place during operation. To remove and replace a worn cutting line, button 710 is depressed sliding the clamp slots into the open position thereby releasing the cutting line from contact with the cutting line channel cartridge. After prolonged use and frequent cutting line replacements, the cutting line tubing cartridge may become worn or have excess buildup of dirt and debris. The cutting line tubing cartridge is then removed from the head and replaced easily. The angled shape of cutting line tubing cartridge keeps it in place during operation and allows for simple removal and installation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A line trimming head comprising:
   (a) a housing;
   (b) a central support fixed within the housing;
   (c) an cylindrical metallic tube diametrically fixed within the housing and forming a continuous circumferential passage for a trimming line;
   (d) the cylindrical metallic tube avoiding the central support and forming at least one blade slot;
   (e) the cylindrical metallic tube further having a first exit port and a second exit port;
   (f) the first exit port forming a first convex surface of revolution about a central axis of the cylindrical metallic tube;
   (g) the second exit port forming a second convex surface of revolution about the central axis of the cylindrical metallic tube;
   (h) a gripper movable between a first position and a second position;
   (i) the first position allowing the admittance of the trimming line through the cylindrical metallic tube;
   (j) the second position providing for holding the trimming line in the cylindrical metallic tube;
   (k) the gripper having at least one locking blade extending into the at least one blade slot, the locking blade having a clamp hole adjacent the circumferential passage;
   (l) the locking blade cooperating with the cylindrical metallic tube to hold the trimming line when the gripper is in the second position;
   (m) the housing further comprises a bottom portion and a top portion;
   (n) the bottom portion including an integrally formed arcuate counterweight extending into the top portion;
   (o) the integrally formed arcuate counterweight positioned adjacent the central support and generally opposite the cylindrical metallic tube;
   (p) cylindrical metallic tube further comprises a generally rectangular cartridge having a first angled section, a guide section and a second angled section integrally formed and further forming a continuous guide channel;
   (q) the first angled section having a first blade slot generally perpendicular to the guide channel; and,
   (r) the second angled section having a second blade slot generally perpendicular to the guide channel.

2. A line trimming head for a line trimmer comprising:
   (a) a support shell having an equatorial perimeter;
   (b) a central attachment stanchion within the support shell for connection to the line trimmer;
   (c) a round circumferentially continuous tubular passage fixed within the support shell adapted to slidably contact a trimming line segment;
   (d) the round circumferentially continuous tubular passage having a first generally convex opening at a first perimeter location on the support shell and a second generally convex opening at a second perimeter location on the support shell;
   (e) a first arcuate counterweight having two arcuate projections spanning generally a first half of the equatorial perimeter of the support shell and one eyelet surrounding the first generally convex opening;
   (f) a second arcuate counterweight having two arcuate projections spanning generally a second half of the equatorial perimeter of the support shell and one eyelet surrounding the second generally convex opening;
   (g) a first locking arm and a second locking arm radially disposed generally perpendicular to the round circumferentially continuous tubular passage and having a pair of clamp slots open to the round circumferentially continuous tubular passage;
   (h) the first locking arm and the second locking arm slidable between a first position in which the trimming line segment can slide in the round circumferentially continuous tubular passage and a second position in which the trimming line segment cannot slide in the round circumferentially continuous tubular passage; and,
   (i) a spring to bias the first locking arm and the second locking arm in the second position.

3. The line trimming head of claim 2 wherein the round circumferentially continuous tubular passage passes through the central attachment stanchion.

4. The line trimming head of claim 2 wherein the round circumferentially continuous tubular passage does not pass through the central attachment stanchion.

5. The line trimming head of claim 2 wherein the round circumferentially continuous tubular passage is comprised of:
   (a) a first serpentine section adjacent the first generally convex opening and the first locking arm;
   (b) a guide section adjacent the first locking arm and the second locking arm; and,
   (c) a second serpentine section adjacent the second generally convex opening and the second locking arm.

6. The line trimming head of claim 5 further comprising:
   (a) an arcuate counterweight integrally formed in the support shell; and, (b) diametrically opposed to the first serpentine section, the guide section and the second serpentine section.

7. The line trimming head of claim 5 wherein the spring is adjacent to the guide section and biases the first and second locking arms against the guide section.

8. A line trimming head for a line trimmer comprising:
(a) a housing;
(b) a trimmer shaft hub support centrally located in the housing;
(c) a pair of cartridge retaining walls fixed within the housing forming a positioning channel adjacent the trimmer shaft hub support;
(d) a replaceable wear cartridge removably fitted within the positioning channel;
(e) the replaceable wear cartridge further comprising:
(f) a first angled section, a guide section and a second angled section all integrally formed;
(g) a circumferentially continuous hole longitudinally spanning the first angled section, the guide section and the second angled section;
(h) a first concave portal formed in a face of the first angled section contiguous with the circumferentially continuous hole;
(i) a second concave portal formed in a face of the second angled section contiguous with the circumferentially continuous hole;
(j) a first blade slot in the replaceable wear cartridge perpendicular to and in ducted communication with the circumferentially continuous hole;
(k) a second blade slot in the replaceable wear cartridge perpendicular to and in ducted communication with the circumferentially continuous hole;
(l) a first locking having a first locking hole slidably disposed in the first blade slot so that the first locking hole intercedes into the circumferentially continuous hole;
(m) a second locking arm having a second locking hole slidably disposed in the second blade slot so that the second locking hole intercedes into the circumferentially continuous hole;
(n) a rigid connection between the first locking arm and the second locking arm;
(o) a biasing means between the rigid connection and the replaceable wear cartridge to bias the first locking arm and the second locking arm between a first position to allow passage of a trimming line through the first locking hole, the second locking hole and the circumferentially continuous hole; and,
(p) a second position to prevent passage of the trimming line through the first locking hole, the second locking hole and the circumferentially continuous hole.

9. The line trimming head of claim 8 wherein the replaceable wear cartridge is constructed from one of the group of steel, copper, brass, aluminum and titanium.

10. The line trimming head of claim 8 wherein the circumferentially continuous hole curves as it passes through the guide section.

11. The line trimming head of claim 8 wherein the circumferentially continuous hole curves as it passes through the first angled section and the second angled section.

12. The line trimming head of claim 8 further comprising an integral offset counterweight formed in the housing adjacent the trimmer shaft hub support and diametrically opposed to the replaceable wear cartridge.

13. A line trimming head for a line trimmer; comprising:
(a) a cover means, having a generally circular perimeter and a set of opposing stanchions located equidistantly proximate the perimeter, for housing a metallic channel means;
(b) an axial support means, concentrically aligned with the perimeter, for attachment of the line trimming head to the line trimmer;
(c) the metallic channel means, operatively positioned in the cover means, for providing a circumferentially continuous channel for a segment of a cutting line;
(d) the metallic channel means further comprising a set of diametrically opposed curved portals for guiding the segment of the cutting line;
(e) a gripper blade means, passing through the metallic channel means, for gripping the segment of the cutting line;
(f) the gripper blade means, further being slidably movable between a first position in which the segment of the cutting line can slide through the circumferentially continuous channel and a second position in which the segment of the cutting line cannot slide through the circumferentially continuous channel;
(g) a bias means, adjacent the gripper blade means and the metallic channel means for biasing the gripper blade means in the second position;
(h) a matched set of two semicircular counterweights positioned at diametric locations in the cover means; and
(i) each of the semicircular counterweights having at least two arcuate projection means for dissipation of heat from movement of the segment of the cuffing line during operation of the line trimmer; and,
(j) the metallic channel means further comprises a removable cartridge, having a continuous hole therethrough for guiding the segment of the cutting line and a set of diametrically opposed convex guide portals concentrically aligned with the axis of the continuous hole.

14. A line trimming head for a line trimmer; comprising:
(a) a cover means. having a generally circular perimeter and a set of opposing stanchions located equidistantly proximate the perimeter. for housing a metallic channel means;
(b) an axial support means, concentrically aligned with the perimeter, for attachment of the line trimming head to the line trimmer;
(c) the metallic channel means, operatively positioned in the cover means, for providing a circumferentially continuous channel for a segment of a cutting line;
(d) the metallic channel means further comprising a set of diametrically opposed curved portals for guiding the segment of the cutting line;
(e) a gripper blade means, passing through the metallic channel means, for gripping the segment of the cutting line;
(f) the gripper blade means, further being slidably movable between a first position in which the segment of the cutting line can slide through the circumferentially continuous channel and a second position in which the segment of the cutting line cannot slide through the circumferentially continuous channel;
(g) a bias means, adjacent the gripper blade means and the metallic channel means for biasing the gripper blade means in the second position;
(h) a matched set of two semicircular counterweights positioned at diametric locations in the cover means; and,
(i) each of the semicircular counterweights having at least two arcuate projection means for dissipation of heat from movement of the segment of the cutting line during operation of the line trimmer; and,
(j) the at least two arcuate projection means include internal heat dissipation fin means for dissipating heat generated by the segment of the cutting line during use of the line trimmer.

* * * * *